Patented Apr. 27, 1943

2,317,361

UNITED STATES PATENT OFFICE 2,317,361

PROCESS OF PRODUCING DRYING OILS, AND PRODUCT

Ivor M. Colbeth, East Orange, N. J., assignor to The Baker Castor Oil Company, New York, N. Y., a corporation of New Jersey No Drawing. Application May 25, 1938, Serial No. 209,980

3 Claims. (Cl. 260—398)

This invention relates to the treatment of castor oil in such a way that pale viscous products result therefrom that will dry when exposed to the atmosphere or will form desirable adhesive hard films when spread upon surfaces.

This is a continuation-in-part of my application Serial No. 723,354, filed May 1, 1934, now Patent No. 2,125,544.

The products formed hereby are viscous liquids having drying properties. They are pale in color and will dissolve in the usual organic solvents that are used in the paint industry, such as turpentine, solvent naphtha, ethyl aceate, gasoline, etc. They can be heated to high temperatures, say about 160° C., for 12 hours, or about 400° C. for 4 hours, in the presence of air with little or no change in color. They are valuable, for example, for replacing other materials such as the blown oils that are produced by blowing air through castor oil at elevated temperatures for long periods of time as they do not possess high acidity and are not dark in color. Also, unlike the usual dry distillation products of castor oil that are prepared by heating castor oil under a vacuum until from about 5% to about 20% of its weight is lost, they are practically free from odor and are much more soluble in alcohol and hydrocarbons than such dry distillation products are.

The viscous oils made in accordance with this invention dry very mch more rapidly than blown castor oil, and they are unlike the so-called dehydrated castor oils which are prepared by treating castor oil in the presence of an acid catalyst in that they contain boron combined with the oil as a result of chemical combination, whereas the dehydrated oils are merely castor oils in which the hydroxyl radical has been removed. The products of this invention also differ from those claimed in my said Patent No. 2,125,544, of August 2, 1938, in being viscous oils which flow easily at room temperature and which dry to form films as do other drying oils, whereas the former are tough resilient products which are thermoplastic solids and cannot be poured at room temperature. The products of this invention do not even become objectionably yellow when heated as mentioned above.

In carrying out this invention with castor oil raw castor oil is mixed with from about 0.1% up to about 3% of boric anhydride or other boron compound such as borax or boric acid or boron oxide. The boric acid may first be dissolved in alcohol and then added to the oil, or the oil may be heated and the boric acid dissolved in the hot oil and a similar procedure is used with borax or the anhydride or other boron compound. The mixture is heated in a still that is preferably maintained under a vacuum. As the temperature rises, the first reaction when boric acid, for example, is used causes the formation of water due to dehydration of the boric acid and the reaction of the resulting boric anhydride with the castor oil. This reaction seems to be much more than the ordinary formation of an ester. It seems to be what has been described as estolide reaction, or reaction of the hydroxyl groups and the carboxyl groups of ricinoleic acid in the oil, as well as the combination of the boric anhydride with the hydroxyl groups of the ricinoleic acid. The temperature should be increased very slowly up to about 260° C., whereupon the product begins to decompose and a number of volatile acids, heptaldehyde, and water distill from the mixture. After the initial decomposition has begun the temperature may be rapidly increased to about 300° C. and maintained at the increased temperature until the desired qualities have been produced. The temperature increment should be about 1° C. per minute up to the temperature of decomposition, and then about 5° C. per minute to reach the higher temperature desired. The mass resulting from the distillation continues to thicken or become more viscous as long as it is heated but the color remains practically as light as the original oil. The heating is stopped before the mass becomes solid.

For example, by starting with castor oil having a viscosity of 150 seconds Engler and a color of 3 Lovibond, the product resulting from this process has a viscosity between 1500 seconds and 2000 seconds Engler and a color of about 10 or 15 yellow when the castor oil has been mixed with about 1% by weight of boric acid and heated slowly up to about 260° C., the temperature then increased, and kept under a vacuum of about 29 inches for about 5 or 6 hours. The color of the palest type of blown castor oil of the same viscosity is from 200 yellow to practically black. The acid value of the product resulting from this process can be maintained below about 8 or 10 by regulating the temperature and vacuum, whereas in the case of pale blown castor oils the acidity increases to as high as 25. When the reaction is complete the resulting product has an iodine value above 100, and it will dry in the atmosphere in about twenty-four hours without the addition of a drier. This is in marked contrast to other oils with like iodine value which would remain liquid for weeks without drying.

Although it is not known with certainty what the reaction is that takes place, it has been found that a product can be made in accordance with this invention having extremely valuable properties. This invention enables castor oil which is normally not a drying oil to be treated and the products resulting therefrom to be used in varnishes and paints which will retain their color even when subjected to baking operations. The products are also remarkable in having excellent resistance to water, alkalis, and acids.

Instead of starting with raw castor oil, the tough resilient product, produced by treating castor oil at an elevated temperature with a boron compound until foaming practically ceases as described in Patent No. 2,125,544, may be mixed with raw castor oil and the mixture treated as already described, whereupon a drying product results that has the properties of drying, paleness, non-coloring by heat, etc., similar to those of the product obtained by using raw castor oil. However, said tough product is so viscous or even hard that some of the castor oil needs to be mixed with it by means of a mechanical mixer or otherwise until the mixture will flow, after which it can be thinned out sufficiently by adding more castor oil. Usually about 3 times as much of castor oil is required as of said tough resilient product.

Or raw castor oil may be dry distilled at temperatures between 260° C. and 300° C. until 5% to 10% of its weight is lost and then treated by this process.

Although the length of time of treatment with the boron compound depends in part upon the desired viscosity of the final product and the size of the batch as well as the temperature, a temperature range of about 260° C. to 300° C. is recommended as temperatures below 260° C. cause the reaction to go on more slowly than is desired and temperatures above 300° C. render control of the viscosity of the final product difficult.

The products formed in accordance with this invention may be oxidized by blowing air through them at temperatures of about 80° C. to 150° C. or the raw oil to be used in the process may be oxidized before being used in the process. In all cases the final products of this invention possess the properties of not becoming discolored and have good drying properties, so that they are suitable for the preparation of paints, varnishes, lacquers and resins, and as a plasticizer of nitrocellulose.

What is claimed is:

1. A liquid oily castor oil product having drying properties and containing chemically combined boron.

2. A boron derivative of an oxidized castor oil, said derivative having drying properties and containing chemically combined boron.

3. The process which comprises treating castor oil with a boron compound by heating it slowly up to a temperature of about 260° C. to form a boron compound and then decomposing said compound by rapidly heating it to about 300° C.

IVOR M. COLBETH.